(12) United States Patent
Kim et al.

(10) Patent No.: US 10,572,043 B2
(45) Date of Patent: Feb. 25, 2020

(54) TOUCH SENSOR AND DISPLAY DEVICE INCLUDING THE SAME

(71) Applicant: Samsung Display Co., Ltd., Yongin-si (KR)

(72) Inventors: Ki Seo Kim, Yongin-si (KR); Jae Kyoung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 116 days.

(21) Appl. No.: 15/619,696

(22) Filed: Jun. 12, 2017

(65) Prior Publication Data

US 2017/0371462 A1 Dec. 28, 2017

(30) Foreign Application Priority Data

Jun. 27, 2016 (KR) ........................ 10-2016-0079873

(51) Int. Cl.
*G06F 3/041* (2006.01)
*G06K 9/00* (2006.01)

(52) U.S. Cl.
CPC .......... *G06F 3/0412* (2013.01); *G06F 3/0414* (2013.01); *G06K 9/0002* (2013.01); *G06F 2203/04102* (2013.01)

(58) Field of Classification Search
CPC ...... G06F 3/0412; G06F 3/0414; G06F 3/044; G06F 2203/04102; G06K 9/0002
See application file for complete search history.

(56) References Cited

U.S. PATENT DOCUMENTS

| 8,766,651 B2 | 7/2014 | Kang et al. |
| 2011/0080373 A1 | 4/2011 | Wang et al. |
| 2015/0296062 A1 | 10/2015 | Lee |

(Continued)

FOREIGN PATENT DOCUMENTS

| CN | 104881195 | 9/2015 |
| EP | 2930597 | 10/2015 |

(Continued)

OTHER PUBLICATIONS

Hiroyuki Hara et al., "Low Temperature Polycrystalline Silicon TFT Fingerprint Sensor with Integrated Comparator Circuit", IEEE, 2004, pp. 403-406.

(Continued)

*Primary Examiner* — Vinh T Lam
(74) *Attorney, Agent, or Firm* — H.C. Park & Associates, PLC

(57) ABSTRACT

A touch sensor including a substrate and a plurality of sensor pixels positioned on the substrate and connected to sensor scan lines and output lines. At least one of the sensor pixels is connected to an ith sensor scan line and a jth output line (where i is an integer of no less than 2 and j is a natural number) and includes a sensor electrode, a first transistor having a gate electrode connected to the sensor electrode to control a current output through the jth output line, a second transistor having a gate electrode connected to the ith sensor scan line and connected between a reference voltage line and the first transistor, and a capacitor electrode forming a first capacitor with the sensor electrode and connected to the ith sensor scan line.

35 Claims, 10 Drawing Sheets

(56) References Cited

U.S. PATENT DOCUMENTS

| | | | |
|---|---|---|---|
| 2015/0331508 A1* | 11/2015 | Nho | G06F 3/0421 |
| | | | 345/173 |
| 2016/0260380 A1* | 9/2016 | Yang | G09G 3/32 |
| 2016/0299598 A1* | 10/2016 | Yoon | G06F 3/044 |
| 2017/0090638 A1* | 3/2017 | Vosgueritchian | G06F 3/0414 |
| 2017/0115811 A1* | 4/2017 | Yang | G06F 3/044 |
| 2017/0161535 A1* | 6/2017 | Lin | G06K 9/0002 |
| 2017/0351364 A1* | 12/2017 | Kim | G06F 3/0416 |
| 2017/0371462 A1* | 12/2017 | Kim | G06F 3/0412 |

FOREIGN PATENT DOCUMENTS

| | | |
|---|---|---|
| KR | 10-2016-0056759 | 5/2016 |
| WO | 2015/196700 | 12/2015 |

OTHER PUBLICATIONS

Extended European Search Report dated Oct. 26, 2017, issued in European Patent Application No. 17178140.4.
European Office Action dated Oct. 7, 2019, in European Patent Application No. 17 178 140.4.

* cited by examiner

TOUCH SENSOR AND DISPLAY DEVICE INCLUDING THE SAME

CROSS-REFERENCE TO RELATED APPLICATION

This U.S. non-provisional patent application claims priority from and the benefit of Korean Patent Application No. 10-2016-0079873, filed on Jun. 27, 2016, which is hereby incorporated by reference for all purposes as if fully set forth herein.

BACKGROUND

Field

The invention relates generally to a touch sensor and a display device including the same, and, more particularly, to such devices capable of detecting fingerprints and the location and/or magnitude of pressure applied to the touch sensor.

Discussion of the Background

As interest in information displays and demands on using portable information media increase, research and commercialization of portable display devices have increased.

Recent display devices display images and include touch sensors for receiving touches of users. Therefore, the users may use the display devices more conveniently through the touch sensors.

In addition, recently, touch sensors have been developed to detect fingerprints and touch pressures, as well as touch positions so that various functions employing these features may be provided to users. Typically, these functions have not been provided into a single touch sensor enabling concurrent detection of touch position, pressure and fingerprint recognition.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments of the invention provide a touch sensor capable of recognizing a fingerprint and the location and/or amount of the applied touch pressure and a display device including the same. In order to concurrently detect fingerprints, touch positions and touch pressures, exemplary embodiments integrate these capabilities into a single touch sensor.

Additional aspects will be set forth in the detailed description which follows, and, in part, will be apparent from the disclosure, or may be learned by practice of the inventive concept.

According to one aspect of the invention, a touch sensor includes a substrate and a plurality of sensor pixels positioned on the substrate and connected to sensor scan lines and output lines. At least one of the sensor pixels is connected to an ith sensor scan line and a jth output line (where i is an integer of no less than 2 and j is a natural number) and at least one of the sensor pixels includes a sensor electrode, a first transistor having a gate electrode connected to the sensor electrode to control a current output through the jth output line, a second transistor having a gate electrode connected to the ith sensor scan line and connected between a reference voltage line and the first transistor, and a capacitor electrode forming a first capacitor with the sensor electrode and connected to the ith sensor scan line.

The at least one sensor pixel may further include a third transistor having a gate electrode connected to an (i−1)th scan line and connected between the reference voltage line and the sensor electrode.

The touch sensor may further include an auxiliary electrode separate from the substrate and forming a second capacitor with the sensor electrode.

The touch sensor may further include an insulating member positioned between the substrate and the auxiliary electrode.

The auxiliary electrode may overlap the sensor electrodes included in the plurality of sensor pixels.

The insulating member may include an elastic layer, a first adhesive layer positioned between the elastic layer and the substrate and a second adhesive layer positioned between the elastic layer and the auxiliary electrode.

Capacitance of the second capacitor may change in response to touch pressure applied from the outside.

A distance between the sensor electrode and the auxiliary electrode may be reduced as the touch pressure increases.

A current output through the jth output line may be reduced as the touch pressure increases.

The touch sensor may further include a sensor scan driver configured to sequentially supply sensor scan signals to the sensor scan lines.

The touch sensor may further includes a circuit configured to detect at least one of a fingerprint and a magnitude of a touch pressure by using currents output through the output lines.

The sensor electrode may be formed of a transparent conductive material.

When a touch is applied to the at least one sensor pixel by a finger of a user, the sensor electrode may form a third capacitor together with the finger.

Pressure caused by the touch may be sensed by using a change in capacitance of the second capacitor corresponding to the touch.

A fingerprint of the finger may be recognized by a change in capacitance of the third capacitor responsive to the touch.

According to another aspect of the invention, a touch sensor may include a plurality of sensor scan lines and a plurality of output lines and a plurality of sensor pixels connected to the sensor scan lines and the output lines. A sensor pixel connected to an ith sensor scan line and a jth output line (where i is an integer of no less than 2 and j is a natural number) may include a first transistor connected to the jth output line and a first node and having a gate electrode connected to a second node, a second transistor connected between a reference voltage line and the first node and having a gate electrode connected to the ith sensor scan line, a first capacitor connected between the second node and the ith scan line, and a second capacitor connected to the second node.

The sensor pixel may further include a third transistor connected between the second node and the reference voltage line and having a gate electrode connected to an (i−1)th scan line.

According to yet another aspect of the invention, a display device may include a substrate, a plurality of sensor pixels positioned on the substrate and connected to sensor scan lines and output lines, and a display panel separate from the substrate and including a plurality of display pixels and an auxiliary electrode. A one of the sensor pixels connected to an ith sensor scan line and a jth output line (where i is an integer of no less than 2 and j is a natural number) may include a sensor electrode, a first transistor having a gate electrode connected to the sensor electrode to control a current output through the jth output line, a second transistor having a gate electrode connected to the ith sensor scan line and connected between a reference voltage line and the first transistor, and a capacitor electrode forming a first capacitor with the sensor electrode and connected to the ith sensor scan line.

The sensor pixel may further include a third transistor having a gate electrode connected to an (i−1)th scan line and connected between the reference voltage line and the sensor electrode.

The auxiliary electrode may form a second capacitor with the sensor electrode.

The display pixels may respectively include organic light emitting diodes (OLED) and the auxiliary electrode may be a cathode electrode commonly included in the OLEDs of the display pixels.

The auxiliary electrode may overlap sensor electrodes included in the plurality of pixels.

The display device may further include an insulating member positioned between the substrate and the display panel.

The display panel may be flexible to permit bending or folding by a user and the insulating member has sufficient elasticity to permit bending or folding of the flexible display panel.

The insulating member may include an elastic layer, a first adhesive layer positioned between the elastic layer and the substrate and a second adhesive layer positioned between the elastic layer and the display panel.

Capacitance of the second capacitor may change in response to touch pressure applied to the at least one sensor pixel.

A distance between the sensor electrode and the auxiliary electrode may be reduced as the touch pressure increases.

A current output through the jth output line may be reduced as the touch pressure increases.

The display device may further include a sensor scan driver configured to sequentially supply sensor scan signals to the sensor scan lines.

The display device may further includes a read-out circuit configured to detect at least one of a fingerprint and touch pressure by using currents output through the output lines.

The sensor electrode may be formed of a transparent conductive material.

The display device may further include a sensor protective layer positioned the substrate and the sensor pixels.

When a touch is applied to the at least one sensor pixel by a finger of a user, the sensor electrode may form a third capacitor together with the finger.

Pressure caused by the touch may be sensed by using a change in capacitance of the second capacitor responsive to the touch.

A fingerprint of the finger may be recognized by using a change in capacitance of the third capacitor responsive to the touch.

According to still another aspect of the invention, a touch sensor may include a plurality of sensor pixels, each sensor pixel including a capacitor, and a circuit electrically connected to each of the plurality of sensor pixels to read out a current passing through the capacitor of at least one of the sensor pixels and determine based on the magnitude of the current passing through the capacitor, whether the associated sensor pixel is not touched by a user's finger, or whether it is touched by a ridge of the user's finger or a touch of a valley of the user's finger.

The plurality of sensor pixels may cover a two dimensional area.

The circuit may use respective determinations of touches of ridges and valleys of the user's finger in the two dimensional area are to determine a fingerprint of the user.

The circuit may determine an identity of the user from the fingerprint of the user.

The circuit may further determine a magnitude of pressure applied at each sensor pixel up to a maximum threshold of determinable pressure.

According to a still further aspect of the invention, a touch sensor may include a plurality of sensor pixels, each sensor pixel including a capacitor, and a circuit electrically connected to each of the plurality of sensor pixels to read out a current passing through the capacitor of at least one of the sensor pixels and determine, based on the current passing through the capacitor of the associated sensor pixel, whether the associated sensor pixel is not touched by a user's finger or whether it is touched by the user's finger, and when the circuit determines that the sensor pixel is touched by the user's finger, the circuit may also determine a magnitude of pressure of the touch of the user's finger based on a magnitude of the current passing through the capacitor of the associated sensor pixel.

According to the above, in various exemplary embodiments, a touch sensor capable of recognizing a fingerprint and an amount and/or location of touch pressure applied thereto, and a display device including the same, are provided.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
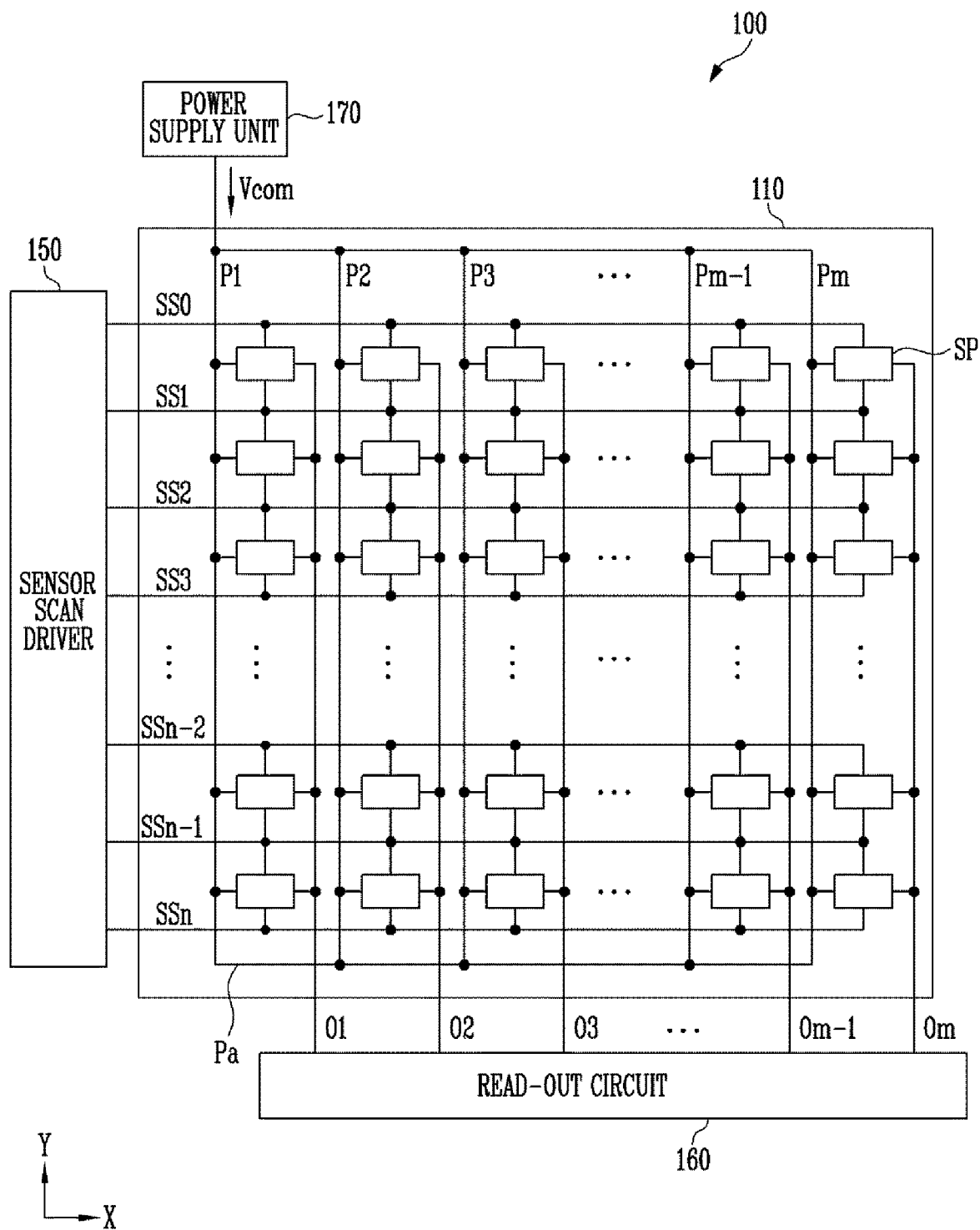
FIG. 1 is a schematic plan view of a touch sensor constructed according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, a touch sensor 100 constructed according to various exemplary embodiments of the invention may recognize a touch input by a user.

For example, the touch sensor 100 is capable of recognizing at least one of i) the position in which the touch is generated; ii) a fingerprint; and iii) the magnitude of the pressure exerted by the user through his finger or other input device such as stylus (hereinafter "touch pressure").

Figure 2:
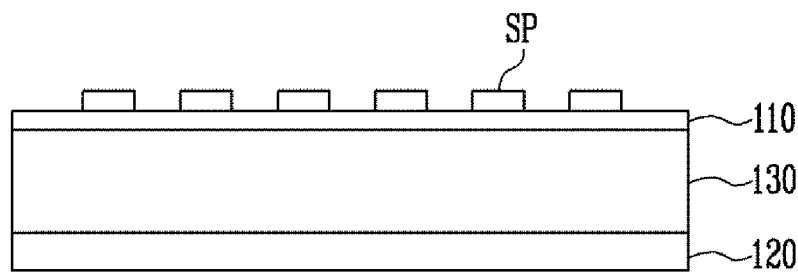
FIG. 2 is a side view of a partial cross-section of the exemplary touch sensor of FIG. 1.

Referring to FIGS. 1 and 2 collectively, the touch sensor 100 according to various exemplary embodiments of the invention may include a substrate 110, a plurality of sensor pixels SP, an auxiliary electrode 120, and an insulating member 130.

The substrate 110 may be formed of an insulating material such as glass and resin. In addition, the substrate 110 may be formed of a flexible material so as to be bent or curved and may have a single layer structure or a multilayer structure.

For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and celluloseacetate propionate.

The substrate 110 may be formed of various materials such as fiber glass reinforced plastic (FRP).

The sensor pixels SP may be positioned on the substrate 110. In addition, the sensor pixels SP may be respectively connected to one or more of the sensor scan lines SS0 through SSn and respectively connected to at least one of output lines O1 through Om.

The sensor pixels SP may receive sensor scan signals through one or more of the sensor scan lines SS0 through SSn to which they are connected, respectively, and may output a predetermined current corresponding to a touch state to the output lines O1 through Om to which they are connected, respectively, in a period in which the sensor scan signals are supplied. As used herein, "touch state" refers to the presence or absence of a touch pressure or a particular magnitude of pressure at a given sensor pixel.

The sensor scan lines SS0 through SSn may be positioned on the substrate 110 and may extend in a first direction (for example, in an X axis direction) to be connected to the sensor pixels SP in units of lines.

The output lines O1 through Om may be positioned on the substrate 110 and may extend in a second direction (for example, in a Y axis direction) to be connected to the sensor pixels SP in other units of lines.

In addition, the sensor pixels SP may be respectively connected to at least one of reference voltage lines P1 through Pm and may receive a reference voltage Vcom through the reference voltage lines P1 through Pm to which they are connected, respectively.

The reference voltage lines P1 through Pm may extend in the second direction (for example, in the Y axis direction) to be connected to the sensor pixels SP in units of lines.

For example, the reference voltage lines P1 through Pm may be arranged in parallel with the output lines O1 through Om.

An arrangement direction of the reference voltage lines P1 through Pm may vary. For example, in various exemplary embodiments, the reference voltage lines P1 through Pm may be arranged in parallel with the sensor scan lines SS0 through SSn.

The reference voltage lines P1 through Pm may be electrically connected in order to maintain the same electric potential.

For example, the reference voltage lines P1 through Pm may be electrically connected through an additional wiring line Pa which may, in various exemplary embodiments, be outside the substrate 110.

In various exemplary embodiments, the touch sensor 100 may further include a sensor scan driver 150 for driving the touch sensor 100, a read-out circuit 160, and a power supply unit 170.

The sensor scan driver 150 may supply the sensor scan signals to the sensor pixels SP through the sensor scan lines SS0 through SSn, respectively.

For example, the sensor scan driver 150 may sequentially output the sensor scan signals to the sensor scan lines SS0 through SSn.

The sensor scan signals may have voltage levels above a threshold voltage at which transistors that receive the sensor scan signals may be turned on.

In order to be connected to the sensor scan lines SS0 through SSn, the sensor scan driver 150 may be directly mounted on the substrate 110 or may, in various embodiments akin to the embodiment of FIG. 1, be connected to the substrate 110 through an additional element such as a flexible printed circuit board (FPCB).

The read-out circuit 160 may receive signals (for example, currents) output from the sensor pixels SP through the output lines O1 through Om, respectively.

For example, when the sensor scan driver 150 sequentially supplies the sensor scan signals to the sensor scan lines SS0 through SSn, the sensor pixels SP are selected in units of lines (horizontal lines in the embodiment of FIG. 1) and the read-out circuit 160 may sequentially receive the currents output through the output lines O1 through Om from the sensor pixels SP in units of lines (vertical lines in the embodiment of FIG. 1).

At this time, the read-out circuit 160 may recognize current touch information, such as the touch state, by sensing the changes in the currents that correspond to changes in presence or the magnitude of the touch pressure using conventional circuitry such as comparators, shift registers, and the like. Similarly, the read-out circuit 160 recognizes the location of the touch because that location is uniquely identified by the combination of the specific sensor scan line SS0 through SSn to which the sensor scan signal is currently being applied and the specific one of the output lines O1 through Om on which the current is being read by the read-out circuit 160.

Thus, the touch information may include at least one of a position of a touch input on the touch sensor 100, and a magnitude of the pressure applied by the touch. Using the foregoing information, the touch information may further include whether a given touch sensed at a specific sensor pixel SP is a valley or a ridge of a fingerprint. And, when a number of valleys and ridges of a fingerprint are to be recognized, sensing may occur over a two dimensional field of sensor pixels SP, such as those sensor pixels SP depicted in the X-Y directions in FIG. 1, for example. The read-out circuit 160 then may assimilate and aggregate that information into a fingerprint and compare that data to the data associated with a known fingerprint to determine whether the sensed and known fingerprints match using appropriate circuitry, including memory, comparator and processing sub-circuits.

Like the sensor scan driver 150 as mentioned above, in order to be connected to the output lines O1 through Om, the read-out circuit 160 may be directly mounted on the substrate 110 or may be connected to the substrate 110 through an additional element such as the FPCB (not shown).

The power supply unit 170 may supply the reference voltage Vcom to the sensor pixels SP through the reference voltage lines P1 through Pm.

In order to be connected to the reference voltage lines P1 through Pm, the power supply unit 170 may, in alternative embodiments, be directly mounted on the substrate 110 or may be connected to the substrate 110 through an additional element such as the FPCB (not shown).

In FIG. 1, the sensor scan driver 150, the read-out circuit 160, and the power supply unit 170 are separately illustrated. However, at least some of these elements separately illustrated in FIG. 1 may be integrated as a single element.

In addition, the sensor scan driver 150, the read-out circuit 160, and the power supply unit 170 may be provided by various methods such as a chip on glass method, a chip on plastic method, a tape carrier package method, and a chip on film method.

Referring to FIG. 2, the auxiliary electrode 120 may be separate from the substrate 110 and may form a capacitor related to the sensor pixels SP, which will be described in detail later.

In addition, the auxiliary electrode 120 may be in the form of a large plate so as to overlap all the sensor pixels SP.

The insulating member 130 may be positioned between the substrate 110 and the auxiliary electrode 120. The insulating member 130 may have elasticity. In addition, the insulating member 130 may be formed of an adhesive and transparent material as well as an elastic member.

For example, the insulating member 130 may be formed of porous polymer so as to have elasticity. In addition, the insulating member 130 may be formed of a foaming agent such as sponge.

For example, the insulating member 130 may include thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicon, and combinations of the above. However, the present invention is not limited thereto.

Figure 3A:
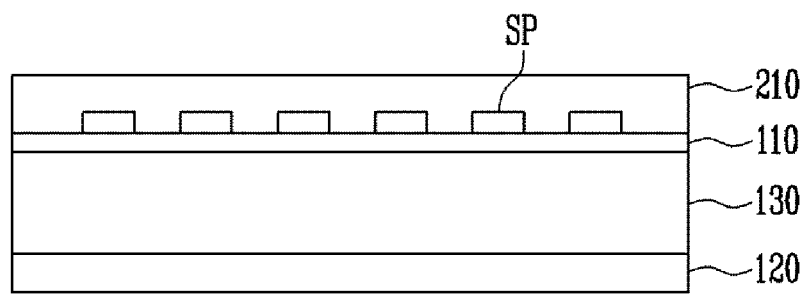
FIGS. 3A through 3C are side views of partial cross-sections of touch sensors according to other exemplary embodiments of the invention.

Referring to FIG. 3A, the touch sensor 100 may further include a sensor protective layer 210.

The sensor protective layer 210 for protecting the sensor pixels SP may be formed on the substrate 110.

The sensor protective layer 210 may be set as a surface that receives a touch of a user and may have a single layer structure or a multilayer structure.

For example, the sensor protective layer 210 may be formed of an insulating material such as glass and resin. In addition, the sensor protective layer 210 may be formed of a flexible material so as to be bent or curved. For example, the sensor protective layer 210 may include a material selected from the above list of materials that may form the substrate 110.

Figure 3B:
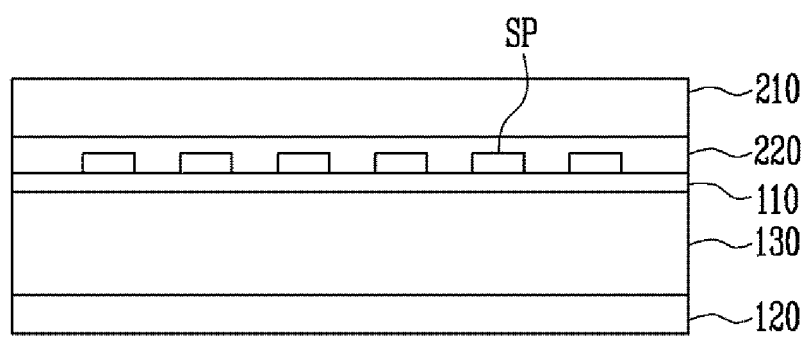

Referring to FIG. 3B, the touch sensor 100 may further include an adhesive layer 220 with the sensor protective layer 210.

In this case, the sensor protective layer 210 may be attached to the substrate 110 through the adhesive layer 220.

For example, the adhesive layer 220 may include optically clear resin (OCR) or optically clear adhesive (OCA).

In addition, in order to increase a dielectric constant, the adhesive layer 220 may include non-conductive nano-particles.

Figure 3C:
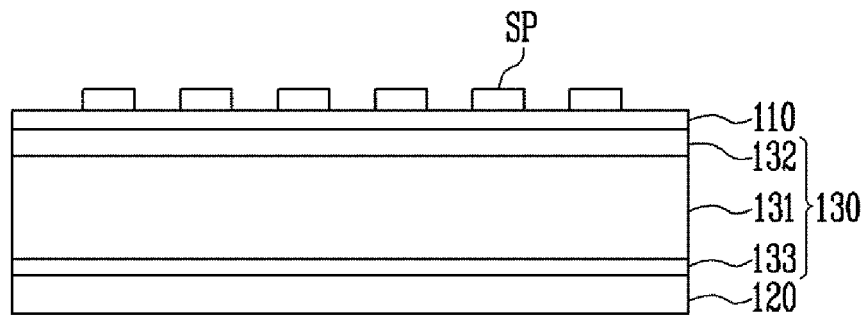

Referring to FIG. 3C, the insulating member 130 may include an elastic layer 131, a first adhesive layer 132, and a second adhesive layer 133.

The elastic layer 131 may be positioned between the substrate 110 and the auxiliary electrode 120.

The first adhesive layer 132 may be positioned between the substrate 110 and the elastic layer 131; and, the second adhesive layer 133 may be positioned between the elastic layer 131 and the auxiliary electrode 120.

When the elastic layer 131 has adhesiveness, the adhesive layers 132 and 133 may be omitted.

Figure 4:
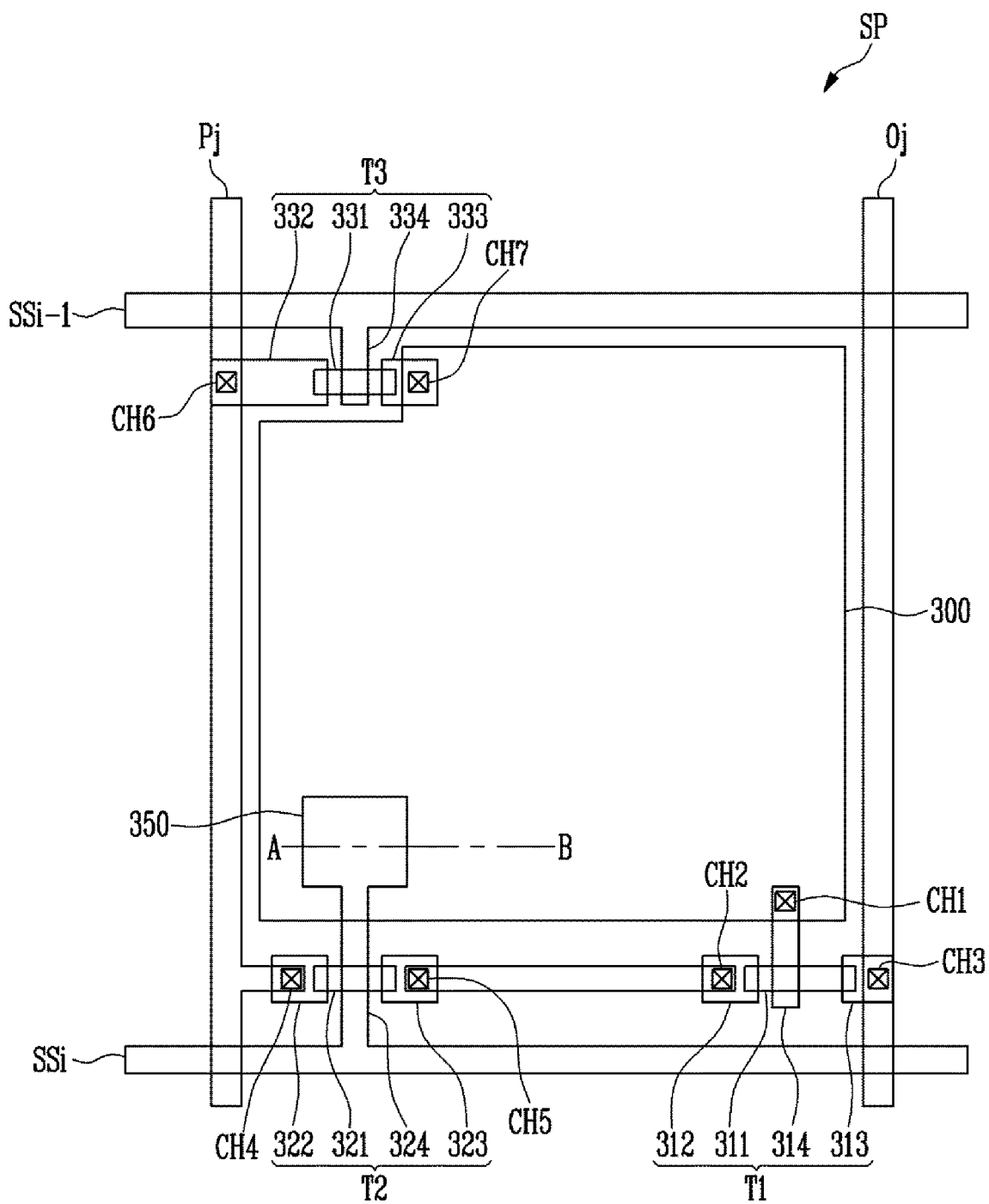
FIG. 4 is a plan view of a sensor pixel constructed according to an exemplary embodiment of the invention.

In FIG. 4, for convenience sake, a sensor pixel SP connected to an ith sensor scan line SSi and a jth output line Oj is illustrated (here, i is an integer of no less than 2 and j is a natural number).

Referring to FIG. 4, the sensor pixel SP may include a sensor electrode 300, a first transistor T1, a second transistor T2, a third transistor T3, and a capacitor electrode 350.

The first transistor T1 may control a current that flows to the jth output line Oj from the second transistor T2. For this purpose, the first transistor T1 may be connected between the jth output line Oj and the second transistor T2.

For example, the first transistor T1 may include a first electrode 312 connected to a second electrode 323 of the second transistor T2, a second electrode 313 connected to the jth output line Oj, a gate electrode 314 connected to the sensor electrode 300, and a semiconductor layer 311 connected between the first electrode 312 and the second electrode 313.

In addition, the gate electrode 314, the first electrode 312, and the second electrode 313 of the first transistor T1 may be respectively connected to other elements through contact holes CH1, CH2, and CH3.

Therefore, the first transistor T1 may control the current Io (see FIG. 7, e.g.) output to the jth output line Oj to correspond to an electric potential of the sensor electrode 300.

The second transistor T2 may be connected between the jth reference voltage line Pj and the first transistor T1.

For example, the second transistor T2 may include a first electrode 322 connected to the jth reference voltage line Pj, a second electrode 323 connected to the first electrode 312 of the first transistor T1, a gate electrode 324 connected to the ith sensor scan line SSi, and a semiconductor layer 321 connected between the first electrode 322 and the second electrode 323.

In addition, the first electrode 322 and the second electrode 323 of the second transistor T2 may be respectively connected to other elements through contact holes CH4 and CH5.

Therefore, the second transistor T2 may be turned on when the sensor scan signal is supplied to the ith sensor scan line SSi. When the second transistor T2 is turned on, the reference voltage Vcom may be applied to the first electrode 312 of the first transistor T1.

The third transistor T3 may be connected between the jth reference voltage line Pj and the sensor electrode 300.

For example, the third transistor T3 may include a first electrode 332 connected to the jth reference voltage line Pj, a second electrode 333 connected to the sensor electrode 300, a gate electrode 334 connected to the (i−1)th sensor scan line SSi−1, and a semiconductor layer 331 connected between the first electrode 332 and the second electrode 333.

In addition, the first electrode 332 and the second electrode 333 of the third transistor T3 may be respectively connected to other elements through contact holes CH6 and CH7.

Therefore, the third transistor T3 may be turned on when the sensor scan signal is supplied to the (i−1)th sensor scan line SSi−1. When the third transistor T3 is turned on, a voltage of the sensor electrode 300 may be initialized to the reference voltage Vcom (see FIG. 1, e.g.).

The capacitor electrode 350 may overlap the sensor electrode 300 and may form a capacitor together with the sensor electrode 300.

In addition, the capacitor electrode 350 may be connected to the ith sensor scan line SSi. For example, the capacitor electrode 350 may be connected to the ith sensor scan line SSi through the gate electrode 324 of the second transistor T2.

The capacitor electrode 350 and the gate electrode 324 of the second transistor T2 may be formed of the same material as the ith sensor scan line SSi.

Figure 6:
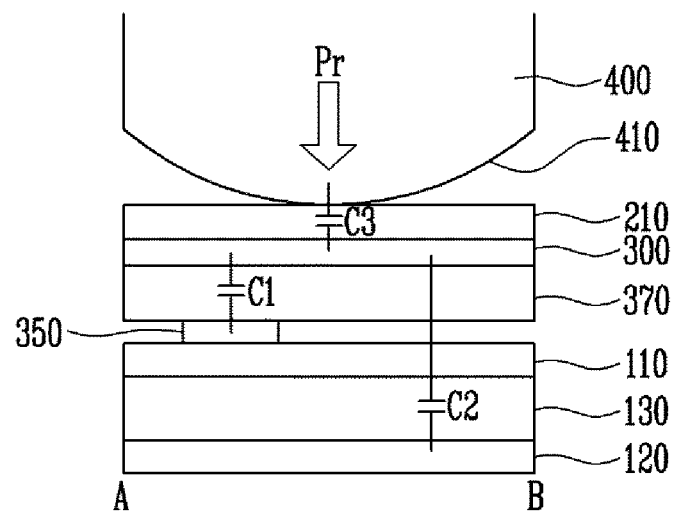
FIG. 6 is a partial schematic cross-sectional side view illustrating a change in capacitance of a second capacitor according to touch pressure applied by a finger.

The sensor electrode 300 may form a capacitor together with the capacitor electrode 350, the auxiliary electrode 120 (see FIG. 2, e.g.), and a finger 400 of a user (see FIG. 6, e.g.).

In addition, the sensor electrode 300 may include a conductive material. For example, metals, an alloy of the metals, conductive polymer, and a transparent conductive material may be used as the conductive material.

The metals may be copper (Cu), silver (Ag), gold (Au), platinum (Pt), palladium (Pd), nickel (Ni), tin (Sn), aluminum (Al), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (An), and lead (Pb).

In addition, the conductive polymer may be a polythiophene-based compound, a polypyrrole-based compound, a polyaniline-based compound, a polyacetylene-based compound, a polyphenylene-based compound, or a combination of the above compounds. In particular, a PEDOT/PSS compound may be used in the polythiophene-based compound.

The transparent conductive material may be AgNW, indium tin oxide (ITO), indium zinc oxide (IZO), antimony zinc oxide (AZO), indium tin zinc oxide (ITZO), zinc oxide (ZnO), tin oxide SnO2, a carbon nano-tube, or grapheme.

Figure 5A:
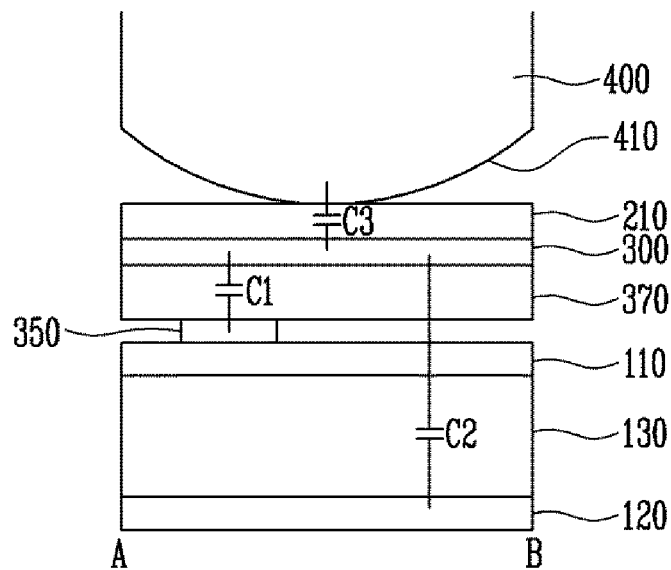
FIGS. 5A and 5B are partial cross-sectional views of the exemplary sensor pixel of FIG. 4 taken along line A-B showing a portion of finger lightly applying or about to apply pressure to the pixel.
Figure 5B:
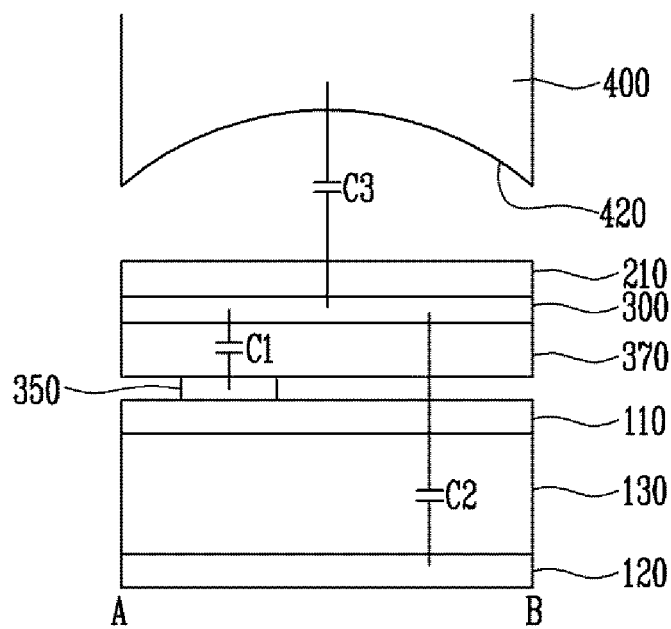

In FIG. 5A, a ridge 410 of a finger 400 is positioned on the sensor pixel SP and, in FIG. 5B, a valley 420 of the finger 400 is positioned on the sensor pixel SP. It should be apparent that for purposes of illustration, in FIGS. 5A and 5B, the size of the finger 400 is greatly minimized from true scale relative to the sizes of the ridge 410 and the valley 420. In reality, the width of a finger 400 is much greater than the widths of ridges 410 and valleys 420 on the finger 400.

The above-described sensor protective layer 210 may be positioned on the sensor electrode 300 and may be used as a surface that receives a touch of a user.

The sensor electrode 300 and the capacitor electrode 350 may form a first capacitor C1. The sensor electrode 300 and the capacitor electrode 350 may be separate from each other and at least one insulating layer 370 may be positioned therebetween.

The sensor electrode 300 and the auxiliary electrode 120 may form a second capacitor C2. The auxiliary electrode 120 may overlap all the sensor electrodes 300 included in the sensor pixels SP.

The auxiliary electrode 120 may include a conductive material. For example, metals, an alloy of the metals, a conductive polymer, and a transparent conductive material may be used as the conductive material.

For example, the auxiliary electrode 120 may include a material selected from the materials that may form the sensor electrode 300 as detailed above.

The sensor electrode 300 and the finger 400 of the user may form a third capacitor C3.

Capacitance of the third capacitor C3 may change in accordance with a distance between the sensor electrode 300 and the finger 400.

Therefore, the capacitance of the third capacitor C3 in a state in which a touch is generated by the finger 400 is different from the capacitance of the third capacitor C3 in a state in which a touch is not generated.

In addition, the capacitance of the third capacitor C3 when the ridge 410 of the finger 400 is positioned on the sensor electrode 300 as illustrated in FIG. 5A is different from the capacitance of the third capacitor C3 when the valley 420 of the finger 400 is positioned on the sensor electrode 300 as approximately illustrated in FIG. 5B.

Since a change in the capacitance of the third capacitor C3 affects the output current Io of the sensor pixel SP, the read-out circuit 160 may recognize whether a touch is generated by a ridge 410 or by a valley 420 of a finger 400 by sensing an amount of change in the output current Io. For example, the read-out circuit 160 may include circuitry capable of sensing the amount of change in the output current Io with another output current read-out, as is well known in the art. In turn, the read-out circuit 160 may use the foregoing information to recognize a fingerprint of the user through appropriate circuitry well known in the art such as processors, comparators, memories, etc. And, further in turn, the fingerprint of the user may be used as a form of identification of the user as is known in the field of biometrics, for example.

In FIG. 6, as with FIG. 5A as described above, it should be apparent that the size of the finger 400 is greatly minimized from true scale relative to the size of the ridge 410. Referring to FIG. 6, when pressure Pr is applied due to the touch performed by the finger 400, a thickness of the elastic insulating member 130 may change. For example, as the pressure Pr applied from the outside increases, the thickness of the insulating member 130 may decrease.

When the thickness of the insulating member 130 decreases, a distance between the sensor electrode 300 and the auxiliary electrode 120 is reduced and the capacitance of the second capacitor C2 increases.

Thus, as the pressure Pr applied from the outside increases, the capacitance of the second capacitor C2 increases.

Since an amount of reduction in the thickness of the insulating member 130 is limited, when the external pressure Pr is larger than a predetermined threshold value, the capacitance of the second capacitor C2 may not increase further.

Because a change in the capacitance of the second capacitor C2 also affects the output current Io of the sensor pixel SP, the read-out circuit 160 may recognize a magnitude of the touch pressure Pr by sensing the amount of change in the output current Io.

Figure 8:
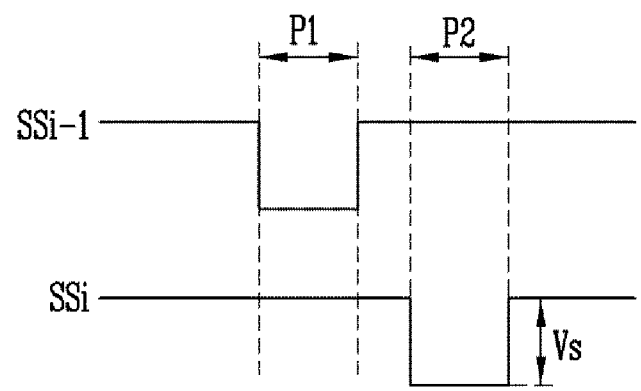
FIG. 8 is a waveform diagram illustrating an exemplary operation of the sensor pixel of FIG. 7.

In FIG. 8, examples of the sensor scan signal supplied to the (i−1)th sensor scan line SSi−1 and the sensor scan signal supplied to the ith sensor scan line SSi are illustrated.

Figure 7:
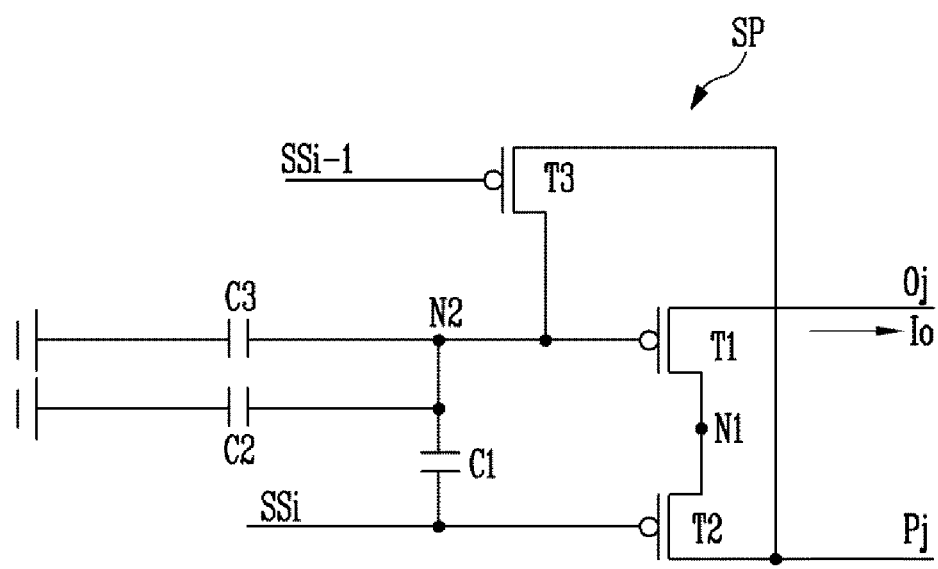
FIG. 7 is an equivalent circuit diagram of the exemplary sensor pixel of FIG. 4.

Referring first though to FIG. 7, the first transistor T1 may be connected between the jth output line Oj and a first node N1.

For example, the first electrode of the first transistor T1 is connected to the first node N1, the second electrode of the first transistor T1 is connected to the jth output line Oj, and the gate electrode of the first transistor T1 may be connected to a second node N2.

The second transistor T2 may be connected between the jth reference voltage line Pj and the first node N1.

For example, the first electrode of the second transistor T2 is connected to the jth reference voltage line Pj, the second electrode of the second transistor T2 is connected to the first node N1, and the gate electrode of the second transistor T2 may be connected to the ith sensor scan line SSi.

The third transistor T3 may be connected between the second node N2 and the jth reference voltage line Pj.

For example, the first electrode of the third transistor T3 is connected to the jth reference voltage line Pj, the second electrode of the third transistor T3 is connected to the second node N2, and the gate electrode of the third transistor T3 may be connected to the (i−1)th sensor scan line SSi−1.

Here, each of the first electrodes of the transistors T1, T2, and T3 is set as one of a source electrode and a drain electrode and each of the second electrodes of the transistors T1, T2, and T3 may be set as an electrode different from the first electrode. For example, when the first electrodes are set as the source electrodes, the second electrodes may be set as the drain electrodes. Likewise, when the first electrodes are set as the drain electrodes, the second electrodes are set as the source electrodes.

In addition, in FIG. 7, the transistors T1, T2, and T3 are illustrated as being p-channel metal-oxide-semiconductor field effect transistor (MOSFET) (PMOS) transistors. However, according to another embodiment, the transistors T1, T2, and T3 may be implemented by n-channel MOSFET NMOS) transistors.

The first capacitor C1 may be connected between the second node N2 and the ith sensor scan line SSi. As described above, the first capacitor C1 may be formed of the sensor electrode 300 and the capacitor electrode 350.

The second capacitor C2 may be connected to the second node N2. For example, the second capacitor C2 may be connected between the second node N2 and a predetermined power source (for example, a ground power source). As described above, the second capacitor C2 may be formed of the sensor electrode 300 and the auxiliary electrode 120.

The third capacitor C3 may be connected to the second node N2. As described above, the third capacitor C3 may be formed of the finger 400 and the sensor electrode 300 that are close to the touch sensor 100.

Accordingly, the first electrode of the first transistor T1 and the second electrode of the second transistor T2 are commonly connected to the first node N1 and the gate electrode of the first transistor T1, the second electrode of the third transistor T3, the first capacitor C1, the second capacitor C2, and the third capacitor C3 are all commonly connected to the second node N2.

Referring to FIG. 8, in a first period P1, the sensor scan signal may be supplied to the (i−1)th sensor scan line SSi−1.

Therefore, in the first period P1, the third transistor T3 may maintain an on state and a voltage of the first node N1 may be initialized to the reference voltage Vcom applied from the jth reference voltage line Pj.

Then, in a second period P2, the sensor scan signal may be supplied to the ith sensor scan line SSi.

Therefore, in the second period P2, the second transistor T2 may maintain an on state and the current Io may flow from the jth reference voltage line Pj to the jth output line Oj through the second transistor T2 and the first transistor T1.

At this time, the first transistor T1 may control an amount of the output current Io to correspond to a gate voltage (the voltage of the first node N1).

For example, the output current Io may change in accordance with the gate voltage Vg of the first transistor T1 and the gate voltage Vg of the first transistor T1 may be determined by the following equation.

$$Vg=Vcom+\{Vc1/(Vc1+Vc2+Vc3)\}*Vs$$

wherein, Vcom represents a reference voltage, Vc1 represents the capacitance of the first capacitor C1, Vc2 represents the capacitance of the second capacitor C2, Vc3 represents the capacitance of the third capacitor C3, and Vs represents a change amount of a voltage of the sensor scan signal supplied to the ith sensor scan line SSi.

Figure 9:
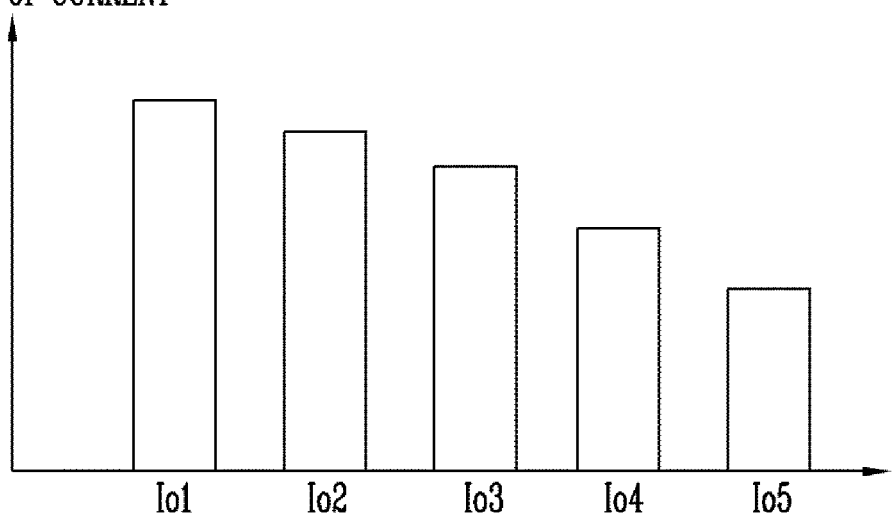
FIG. 9 is a graphical view of exemplary output currents of a sensor pixel of the invention in various exemplary touch states.

Referring now to FIG. 9, a first output current Io1 is obtained in a state in which a sensor pixel SP is not touched.

A second output current Io2 is obtained in a state in which the valley 420 of the finger 400 is positioned on the sensor pixel SP (refer to FIG. 5B) and a third output current Io3 is obtained in a state in which the ridge 410 of the finger 400 is positioned on the sensor pixel SP (refer to FIG. 5A).

In particular, the second output current Io2 and the third output current Io3 are obtained in a state in which the finger 400 touches the sensor but applies no, or only a very small amount of, pressure.

When the touch is generated by the finger 400, since the capacitance of the third capacitor C3 increases, magnitudes of the second and third output currents Io2 and Io3 output from the first transistor T1 may be smaller than a magnitude of the first output current Io1.

Therefore, by sensing the comparative difference(s) in the currents as is well known in the art, the read-out circuit 160 may recognize that the touch is performed on the sensor pixel SP through the second and third output currents Io2 and Io3.

In addition, since the magnitudes of the output currents Io2 and Io3 vary in accordance with the touch performed by the valley 420 of the finger 400 and the touch performed by the ridge 410 of the finger 400, again, by sensing the comparative difference(s) in the currents as is well known in the art, the read-out circuit 160 may recognize the valley 420 and the ridge 410 of the finger 400 by sensing amounts of change in the second and third output currents Io2 and Io3 in comparison with an amount of change in the first output current Io1.

A fourth output current Io4 is obtained in a state in which the valley 420 of the finger 400 is positioned on the sensor pixel SP and predetermined pressure is applied and a fifth output current Io5 is obtained in a state in which the ridge 410 of the finger 400 is positioned on the sensor pixel SP and predetermined pressure is applied (refer to FIG. 6).

When the pressure is generated by the finger 400, since the capacitance of the second capacitor C2 increases, magnitudes of a fourth output current Io4 and a fifth output current Io5 may be smaller than the magnitudes of the second output current Io2 and the third output current Io3.

Therefore, by again sensing the comparative difference(s) between the respective read-outs of currents as is well known in the art, the read-out circuit 160 may recognize the intensity (magnitude) of the applied pressure by sensing an amount of change in the fourth output current Io4 in comparison with an amount of change in the second output current Io2. In addition, the read-out circuit 160 may recognize the intensity (magnitude) of the pressure by sensing an amount of change in the fifth output current Io5 in comparison with an amount of change in the third output current Io3.

Figure 10:
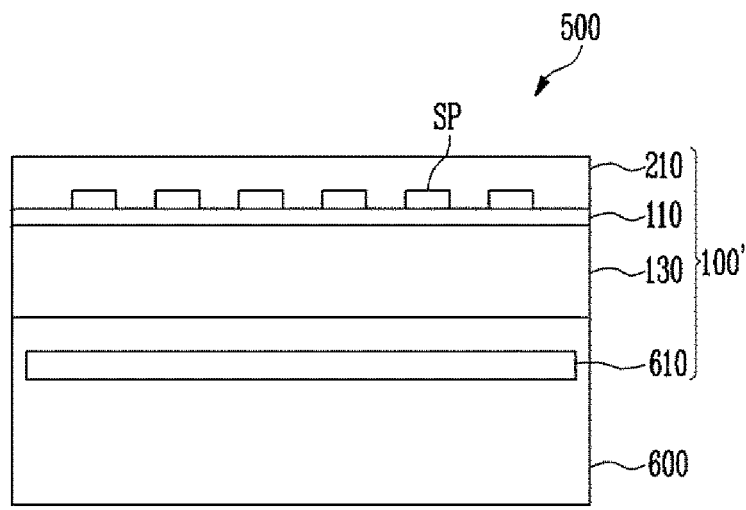
FIG. 10 is a partial cross-sectional side view of a display device with sensor pixels constructed according to an exemplary embodiment of the invention.

Referring to FIG. 10, the display device 500 may include a touch sensor 100' and a display panel 600.

The display panel 600 for providing an image to a user may display the image through a plurality of display pixels. The display panel 600 may include an auxiliary electrode 610 for supplying a driving voltage to the display pixels.

The touch sensor 100' may include the substrate 110, the plurality of sensor pixels SP, the auxiliary electrode 610, and the insulating member 130, which is the same as with the above-described touch sensor 100.

However, in the touch sensor 100', the auxiliary electrode 610 included in the display panel 600 may be used as the above-described auxiliary electrode 120.

In accordance with presence of the display panel 600, the insulating member 130 may be positioned between the substrate 100 and the display panel 600.

As described above, the touch sensor 100' may further include the sensor protective layer 210 (refer to FIG. 3A) or the additional adhesive layer 220 for having the sensor protective layer 210 and the substrate 110 adhere to each other (refer to FIG. 3B).

In addition, the insulating member 130 of the touch sensor 100' may include an elastic layer 131, a first adhesive layer 132, and a second adhesive layer 133 as described above (refer to FIG. 3C).

In this case, the elastic layer 131 may be positioned between the substrate 110 and the display panel 600.

At this time, the first adhesive layer 132 is positioned between the substrate 110 and the elastic layer 131 and the second adhesive layer 133 may be positioned between the elastic layer 131 and the display panel 600.

Since the touch sensor 100' may perform the same function as the above-described touch sensor 100, detailed description thereof will not be given.

Figure 11:
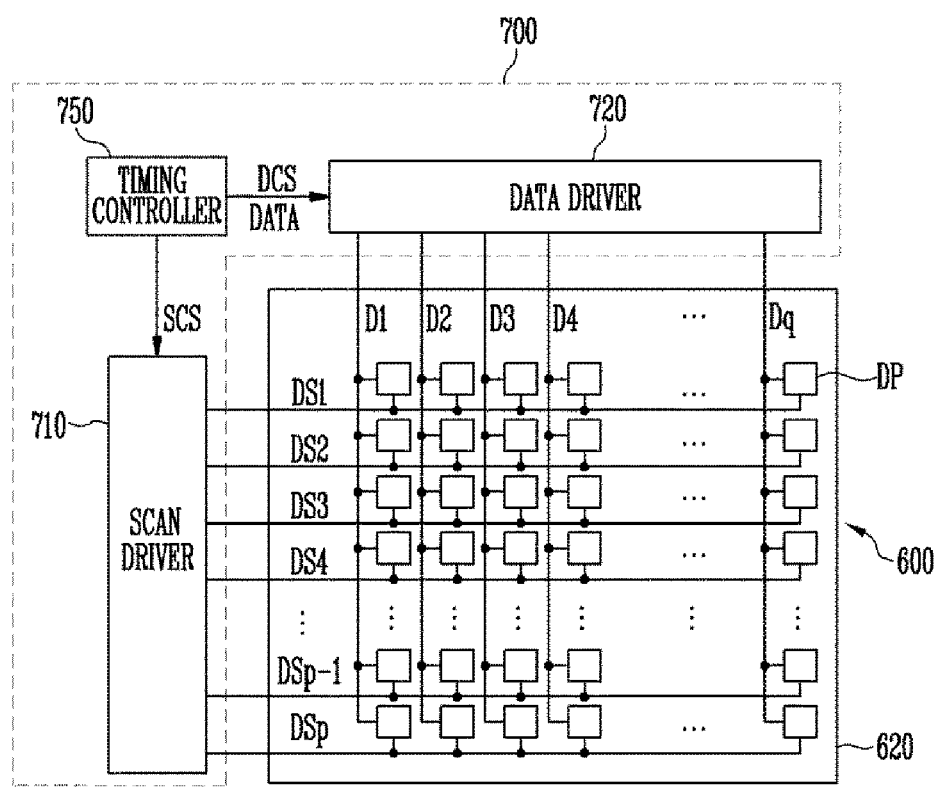
FIG. 11 is a schematic plan view of a display panel with associated circuitry constructed according to an exemplary embodiment of the invention.

Referring to FIG. 11, the display panel 600 may include a substrate 620 and a plurality of display pixels DP.

The substrate 620 may be formed of an insulating material such as glass and resin. In addition, the substrate 620 may be formed of a flexible material so as to be bent or curved and may have a single layer structure or a multilayer structure.

For example, the substrate 620 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and celluloseacetate propionate.

The substrate 620 may be formed of various materials such as fiber glass reinforced plastic (FRP).

The display pixels DP may be connected to data lines D1 through Dq and display scan lines DS1 through DSp. For example, the display pixels DP may be arranged in a matrix at intersections of the data lines D1 through Dq and the display scan lines DS1 through DSp.

In addition, the display pixels DP may receive data signals and scan signals through the data lines D1 through Dq and the display scan lines DS1 through DSp, respectively.

The display pixels DP may include light emitting elements (for example, organic light emitting diodes (OLED)) and may generate light components corresponding to the data signals by currents that flow from a first power source ELVDD to a second power source ELVSS via the light emitting elements.

The display device 500 may further include a display driver 700 for driving the display panel 600.

The display driver 700 may include a scan driver 710, a data driver 720, and a timing controller 750.

The scan driver 710 may supply scan signals to the display scan lines DS1 through DSp in response to a scan driver control signal SCS. For example, the scan driver 710 may sequentially supply the scan signals to the display scan lines DS1 through DSp.

In order to be connected to the display scan lines DS1 through DSq, the scan driver 710 may be directly mounted on the substrate 620 or may be connected to the substrate 620 through an additional element such as the FPCB.

The data driver 720 may generate the data signals by receiving a data driver control signal DCS and image data DATA from the timing controller 750.

The data driver 720 may supply the generated data signals to the data lines D1 through Dq.

In order to be connected to the data lines D1 through D1, the data driver 720 may be directly mounted on the substrate 620 or may be connected to the substrate 620 through an additional element such as the FPCB.

When a scan signal is supplied to a specific display scan line DS, some display pixels DP connected to the specific display scan line may receive the data signals transmitted from the data lines D1 through Dq and the some display pixels DP may emit light components with brightness components corresponding to the received data signals.

The timing controller 750 may generate control signals for controlling the scan driver 710 and the data driver 720.

For example, the control signals may include the scan driver control signal SCS for controlling the scan driver 710 and the data driver control signal DCS for controlling the data driver 720.

In addition, the timing controller 750 supplies the scan driver control signal SCS to the scan driver 710 and may supply the data driver control signal DCS to the data driver 720.

The timing controller 750 converts the image data DATA to be suitable for a specification of the data driver 720 and may supply the converted image data DATA to the data driver 720.

In FIG. 11, the scan driver 710, the data driver 720, and the timing controller 750 are illustrated as being separate from each other. However, at least some of the elements may be integrated in other embodiments.

In addition, the scan driver 710, the data driver 720, and the timing controller 750 may be provided by various methods such as a chip on glass method, a chip on plastic method, a tape carrier package method, and a chip on film method.

Figure 12A:
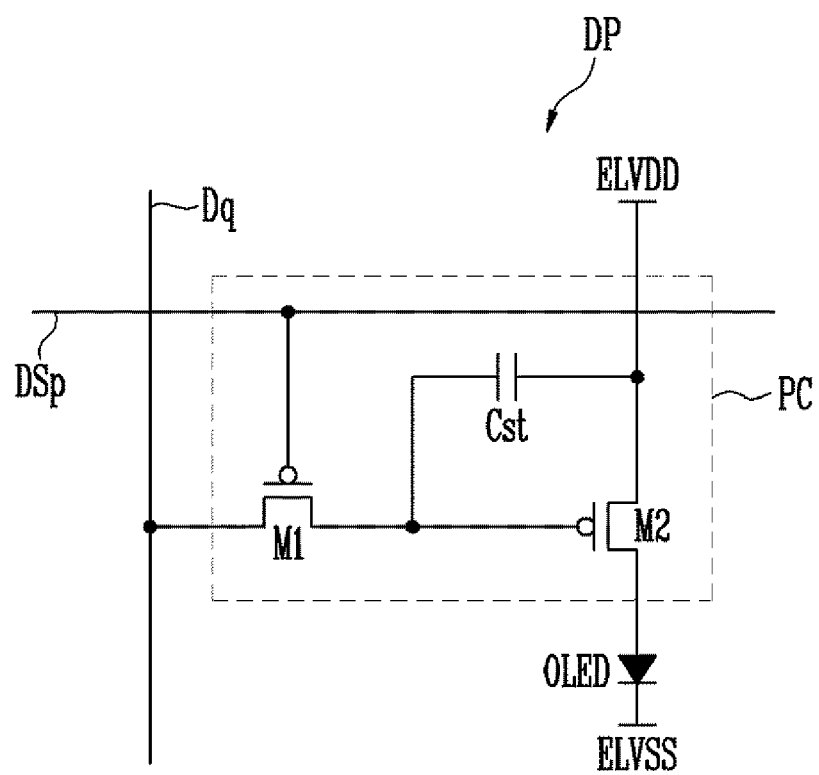
FIGS. 12A and 12B are partial schematic views of exemplary circuits for the display pixel of FIG. 11.
Figure 12B:
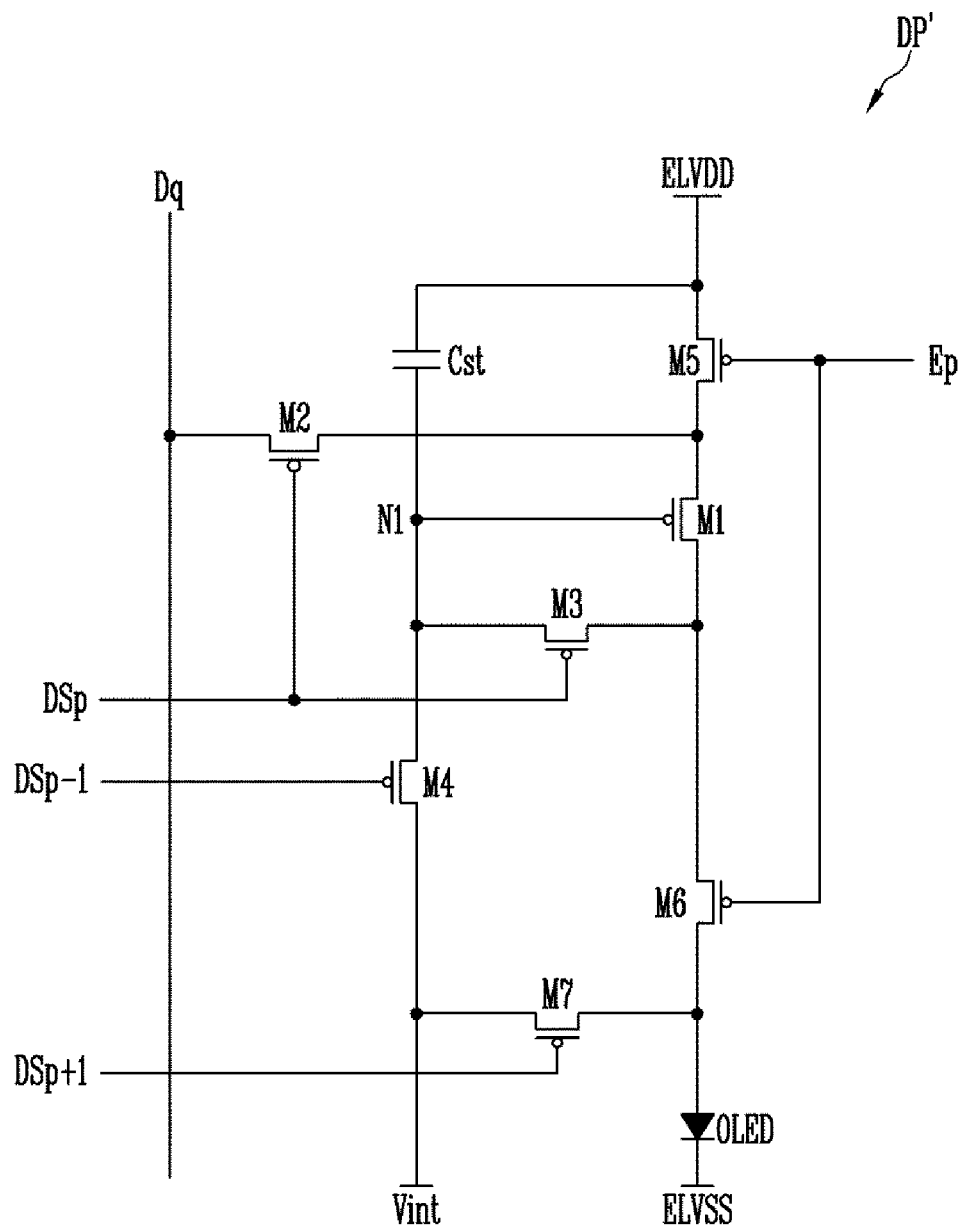

In FIGS. 12A and 12B, display pixels DP and DP' are connected to a pth display scan line DSp and a qth data line Dq.

First, referring to FIG. 12A, the display pixel DP includes an OLED and a pixel circuit PC connected to the qth data line Dq and the pth display scan line DSp to control the OLED.

An anode electrode of the OLED is connected to the pixel circuit PC and a cathode electrode thereof may be connected to the second power source ELVSS.

The OLED may generate light with predetermined brightness to correspond to a current supplied from the pixel circuit PC.

The pixel circuit PC may store a data signal supplied to the qth data line Dq when a display scan signal is supplied to the pth display scan line DSp and may control an amount of current supplied to the OLED in response to the stored data signal.

For example, the pixel circuit PC may include a first transistor M1, a second transistor M2, and a storage capacitor Cst.

The first transistor M1 may be connected between the qth data line Dq and the second transistor M2.

For example, a gate electrode of the first transistor M1 is connected to the pth display scan line DSp, a first electrode thereof is connected to the qth data line Dq, and a second electrode thereof may be connected to a gate electrode of the second transistor M2.

The first transistor M1 is turned on when the display scan signal is supplied from the pth display scan line DSp and may supply the data signal from the qth data line Dq to the storage capacitor Cst.

At this time, the storage capacitor Cst may charge a voltage corresponding to the data signal.

The second transistor M2 may be connected between the first power source ELVDD and the OLED.

For example, the gate electrode of the second transistor M2 is connected to a first electrode of the storage capacitor Cst and the second electrode of the first transistor M1, a first electrode thereof is connected to a second electrode of the storage capacitor Cst and the first power source ELVDD, and a second electrode thereof may be connected to the anode electrode of the OLED.

The second transistor M2 as a driving transistor may control an amount of current that flows from the first power source ELVDD to the second power source ELVSS via the OLED to correspond to a voltage value stored in the storage capacitor Cst.

At this time, the OLED may generate light corresponding to the amount of current supplied from the second transistor M2.

Here, each of the first electrodes of the transistors M1 and M2 is set as one of a source electrode and a drain electrode and each of the second electrodes of the transistors M1 and M2 may be set as an electrode type different from the first electrode. For example, when the first electrodes are set as the source electrodes, the second electrodes may be set as the drain electrodes.

In addition, the transistors M1 and M2 are illustrated as being PMOS transistors in FIG. 12A. However, the transistors M1 and M2 may be NMOS transistors.

On the other hand, referring to FIG. 12B, the display pixel DP' may include an OLED, first through seventh transistors M1 through M7, and a storage capacitor Cst.

An anode electrode of the OLED is connected to the first transistor M1 via the sixth transistor M6 and a cathode electrode thereof may be connected to the second power source ELVSS. The OLED may generate light with predetermined brightness to correspond to an amount of current supplied from the first transistor M1.

The first power source ELVDDD may be set to have a higher voltage than the second power source ELVSS so that a current may flow to the OLED.

The seventh transistor M7 may be connected between an initializing power source Vint and the anode electrode of the OLED. A gate electrode of the seventh transistor M7 may be connected to a (p+1)th display scan line DSp+1. The seventh transistor M7 is turned on when a display scan signal is supplied to the (p+1)th display scan line DSp+1 and may supply a voltage of the initializing power source Vint to the anode electrode of the OLED. Here, the initializing power source Vint may be set to have a lower voltage than a data signal.

The sixth transistor M6 may be connected between the first transistor M1 and the OLED. A gate electrode of the sixth transistor M6 may be connected to a pth emission control line Ep. The sixth transistor M6 is turned off when an emission control signal is supplied to the pth emission control line Ep and may be turned on otherwise.

The fifth transistor M5 may be connected between the first power source ELVDD and the first transistor M1. A gate electrode of the fifth transistor M5 may be connected to the pth emission control line Ep. The fifth transistor M5 is turned off when the emission control signal is supplied to the pth emission control line Ep and may be turned on otherwise.

A first electrode of the first transistor M1 (a driving transistor) is connected to the first power source ELVDD via the fifth transistor M5 and a second electrode thereof may be connected to the anode electrode of the OLED via the sixth transistor M6. A gate electrode of the first transistor M1 may be connected to a first node N1. The first transistor M1 may control an amount of current that flows from the first power source ELVDD to the second power source ELVSS via the OLED to correspond to a voltage of the first node N1.

The third transistor M3 may be connected between the second electrode of the first transistor M1 and the first node N1. A gate electrode of the third transistor M3 may be connected to the pth display scan line DSp. The third transistor M3 is turned on when a display scan signal is supplied to the pth display scan line DSp and may electrically connect the second electrode of the first transistor M1 and the first node N1. Therefore, when the third transistor M3 is turned on, the first transistor M1 may be diode-connected.

The fourth transistor M4 may be connected between the first node N1 and the initializing power source Vint. A gate electrode of the fourth transistor M4 may be connected to a (p−1)th display scan line DSp−1. The fourth transistor M4 is turned on when a display scan signal is supplied to the (p−1)th display scan line DSp−1 and may supply the voltage of the initializing power source Vint to the first node N1.

The second transistor M2 may be connected between the qth data line Dq and the first electrode of the first transistor M1. A gate electrode of the second transistor m2 may be connected to the pth display scan line DSp. The second transistor M2 is turned on when a display scan signal is supplied to the pth display scan line DSp and may electrically connect the qth data line Dq and the first electrode of the first transistor M1.

The storage capacitor Cst may be connected between the first power source ELVDD and the first node N1. The storage capacitor Cst may store a data signal and a voltage corresponding to a threshold voltage of the first transistor M1.

Here, each of the first electrodes of the transistors M1, M2, M3, M4, M5, M6, and M7 is set as one of a source electrode and a drain electrode and each of the second electrodes of the transistors M1, M2, M3, M4, M5, M6, and M7 may be set as an electrode of a different type from the first electrode. For example, when the first electrodes are set as the source electrodes, the second electrodes may be set as the drain electrodes.

In addition, in FIG. 12B, the transistors M1, M2, M3, M4, M5, M6, and M7 are illustrated as being PMOS transistors. However, the transistors M1, M2, M3, M4, M5, M6, and M7 may be NMOS transistors.

Structures of the display pixels DP and DP' are not limited to the above-described pixel structures. Actually, the display pixels DP and DP' have circuit structures in which currents may be supplied to the OLEDs and the circuit structures may be selected from various well-known structures.

The first power source ELVDD is a high electric potential power source and the second power source ELVSS may be a low electric potential power source.

For example, the first power source ELVDD may be set to have a positive voltage and the second power source ELVSS may be set to have a negative voltage or a ground voltage.

Figure 13:
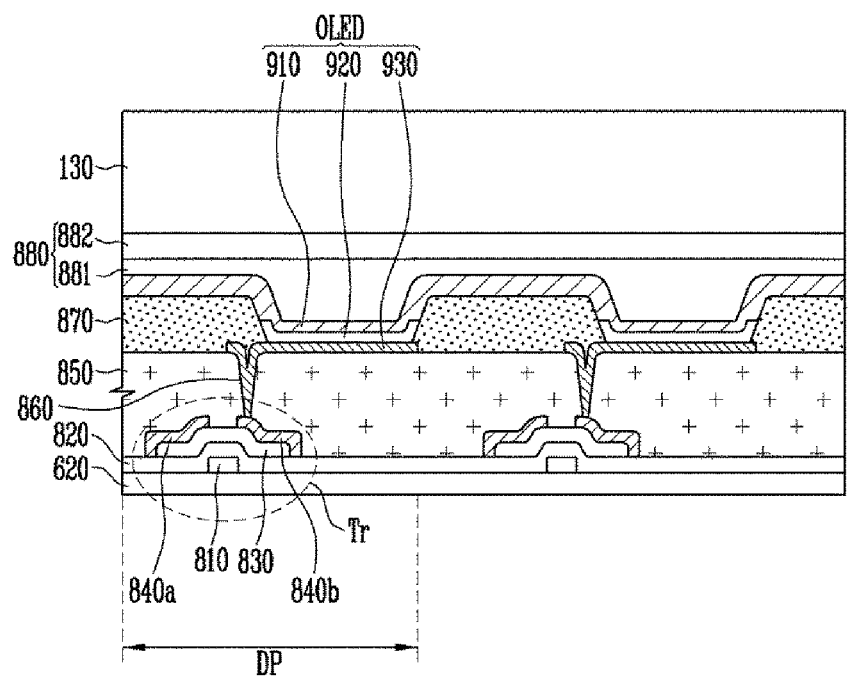
FIG. 13 is a partial cross-sectional side view of a display panel according to an exemplary embodiment of the invention.

Referring to FIG. 13, an OLED may include an anode electrode 930, a light emitting layer 920, and a cathode electrode 910.

The light emitting layer 920 may be positioned between the anode electrode 930 and the cathode electrode 910.

For example, the light emitting layer 920 preferably includes an organic light emitting layer for self-emission.

The light emitting layer 920 may have a structure in which a hole transporting layer, the organic light emitting layer, and an electron transporting layer are stacked and may further include a hole injection layer and an electron injection layer.

Due to the above-described structure, holes injected from the anode electrode 930 and electrons injected from the cathode electrode 910 are combined in the organic light emitting layer 920 so that excitons are generated and light with a specific wavelength may be generated by energy from the generated excitons in the light emitting layer 920.

In particular, the cathode electrode 910 may be connected to the second power source ELVSS and may be used as the above-described auxiliary electrode 610.

That is, since the cathode electrode 910 overlaps the sensor electrodes 300 of the touch sensor 100', the cathode electrode 910 may be used as the auxiliary electrode 610 of the touch sensor 100'.

In this case, the cathode electrode 610 of the display panel 600 and a ground electrode (not shown) of the touch sensor 100' may be set to have the same electric potential.

The cathode electrode 910 may include a conductive material. For example, metals, an alloy of the metals, conductive polymer, or a transparent conductive material may be used as the conductive material.

The cathode electrode 910 may include a material selected from materials that may form the above-described sensor electrode 300.

A plurality of display pixels DP may be positioned on the substrate 620. At this time, the display pixel DP may be formed of a pixel circuit (not shown) including a driving transistor Tr and an OLED.

In FIG. 13, for convenience sake, only the driving transistor Tr directly related to the OLED is illustrated. However, the pixel circuit (not shown) may include a transistor in addition to the driving transistor Tr and a capacitor in order to control emission of the OLED.

The driving transistor Tr is formed on the substrate 620 and may be provided to correspond to the OLED.

The driving transistor Tr may include a gate electrode 810, a gate insulating layer 820, a semiconductor layer 830, and source/drain electrodes 840a and 840b.

The gate electrode 810 may be formed on the substrate 620.

The gate insulating layer 820 may be formed on the gate electrode 810. For example, the gate insulating layer 820 may be formed of an insulating material such as a silicon oxide layer (SiOx) or a silicon nitride layer (SiNx).

The semiconductor layer 830 may be formed on the gate insulating layer 820. For example, the semiconductor layer 830 may be formed of polysilicon obtained by crystallizing amorphous silicon using a laser.

In addition, the semiconductor layer 830 may be formed of amorphous silicon or oxide semiconductor in addition to polysilicon.

The source/drain electrodes 840a and 840b may be positioned at both sides of the semiconductor layer 830.

A protective layer 850 may be positioned on the driving transistor Tr and may include a contact hole 860 that exposes the source electrode 840a or the drain electrode 840b. In FIG. 13, the drain electrode 840b is exposed by the contact hole 860.

The gate electrode 810 and the source/drain electrodes 840a and 840b may be formed of metals such as Mo, W, Ti, and Al or an ally or a stacked structure of the above metals, but other materials and structures may be used as apparent to the skilled artisan.

An anode electrode 930 may be formed on the protective layer 850 and the anode electrode 930 may be connected to the source electrode 840a or the drain electrode 840b through the contact hole 860. In FIG. 13, the anode electrode 930 is connected to the drain electrode 840b through the contact hole 860.

For example, the protective layer 850 may be formed of the insulating material such as the silicon oxide layer or the silicon nitride layer.

A pixel defining layer 870 may be positioned on the protective layer 850. In addition, the pixel defining layer 870 may expose at least a partial region of the anode electrode 930.

For example, the pixel defining layer 870 may be formed of one of organic insulating materials such as an acryl-based organic compound, polyamide, and polyimide. However, the present invention is not limited thereto and the pixel defining layer 870 may be formed of various insulating materials.

A thin film encapsulation layer 880 may be positioned on the OLED. Specifically, the thin film encapsulation layer 880 may be positioned on the cathode electrode 910.

In addition, the thin film encapsulation layer 880 may have a structure in which a plurality of layers are stacked. For example, the thin film encapsulation layer 880 may include at least one organic layer 881 and at least one inorganic layer 882.

In FIG. 13, the thin film encapsulation layer 880 includes one organic layer 881 and one inorganic layer 882. However, the thin film encapsulation layer 880 may include a plurality of organic layers 881 and a plurality of inorganic layers 882. In this case, the organic layers 881 and the inorganic layers 882 may be alternately stacked.

The insulating member 130 may be positioned on the thin film encapsulation layer 880.

Figure 14:
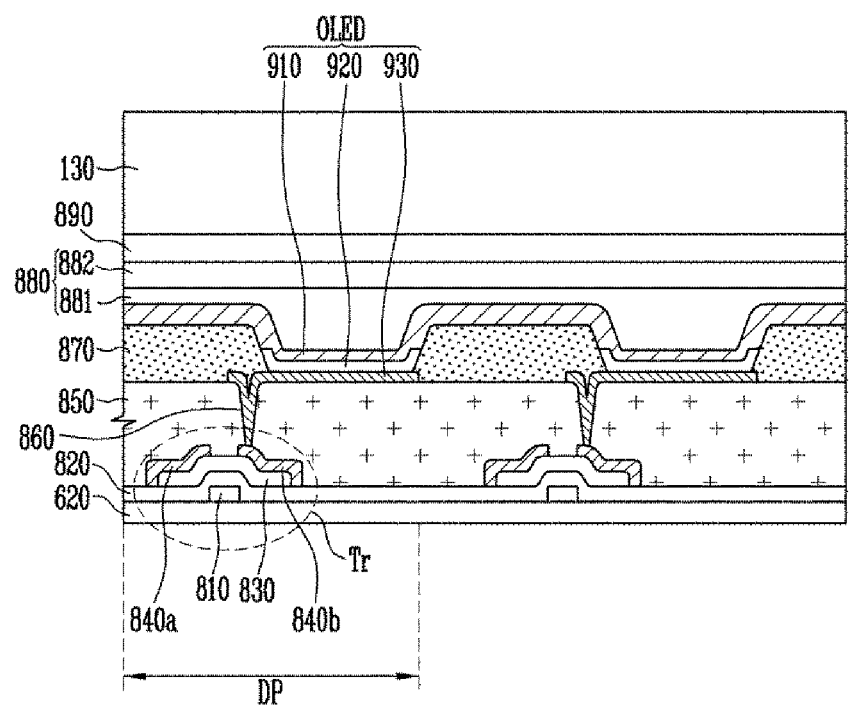
FIG. 14 is a partial cross-sectional side view of a display panel including a flat plate according to an exemplary embodiment of the invention.

Referring to FIG. 14, the display panel 600 may further include a polarizing plate 890.

The polarizing plate 890 may be positioned on the thin film encapsulation layer 880 and the insulating member 130 may be positioned on the polarizing plate 890.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor comprising:
a substrate; and
a plurality of sensor pixels positioned on the substrate and connected to sensor scan lines and output lines,
wherein at least one of the sensor pixels is connected to an ith sensor scan line and a jth output line (where i is an integer of no less than 2 and j is a natural number) and comprises:
a sensor electrode;
a first transistor having a gate electrode connected to the sensor electrode to control a current output through the jth output line;
a second transistor having a gate electrode directly connected to the ith sensor scan line and connected between a reference voltage line and one of a source electrode and a drain electrode of the first transistor; and
a capacitor electrode forming a first capacitor with the sensor electrode and connected to the ith sensor scan line.

2. The touch sensor of claim 1, wherein the at least one sensor pixel further comprises a third transistor having a gate electrode connected to an (i−1)th sensor scan line and connected between the reference voltage line and the sensor electrode.

3. The touch sensor of claim 1, further comprising an auxiliary electrode separate from the substrate and forming a second capacitor with the sensor electrode.

4. The touch sensor of claim 3, wherein the auxiliary electrode overlaps the sensor electrodes included in the plurality of sensor pixels.

5. The touch sensor of claim 3, further comprising an insulating member positioned between the substrate and the auxiliary electrode.

6. The touch sensor of claim 5, wherein the insulating member comprises:
an elastic layer;
a first adhesive layer positioned between the elastic layer and the substrate; and
a second adhesive layer positioned between the elastic layer and the auxiliary electrode.

7. The touch sensor of claim 3, wherein capacitance of the second capacitor changes in response to touch pressure applied to the at least one sensor pixel from the outside.

8. The touch sensor of claim 7, wherein a distance between the sensor electrode and the auxiliary electrode is reduced as the touch pressure increases.

9. The touch sensor of claim 8, wherein a current output through the jth output line is reduced as the touch pressure increases.

10. The touch sensor of claim 3, wherein, when a touch is applied to the at least one sensor pixel by a finger of a user, the sensor electrode forms a third capacitor together with the finger.

11. The touch sensor of claim 10, wherein pressure caused by the touch is sensed by a change in capacitance of the second capacitor responsive to the touch.

12. The touch sensor of claim 11, wherein a fingerprint of the finger is recognized by a change in capacitance of the third capacitor responsive to the touch.

13. The touch sensor of claim 1, further comprising a sensor scan driver configured to sequentially supply sensor scan signals to the sensor scan lines.

14. The touch sensor of claim 13, further comprising a circuit configured to detect at least one of a fingerprint and a magnitude of a touch pressure by using currents output through the output lines.

15. The touch sensor of claim 1, wherein the sensor electrode is formed of a transparent conductive material.

16. A touch sensor comprising:
a plurality of sensor scan lines and a plurality of output lines; and
a plurality of sensor pixels connected to the sensor scan lines and the output lines,
wherein one of the sensor pixels connected to an ith sensor scan line and a jth (where i is an integer of no less than 2 and j is a natural number) output line comprises:
a first transistor directly connected to the jth output line and a first node and having a gate electrode connected to a second node;
a second transistor connected between a reference voltage line and the first node and having a gate electrode directly connected to the ith sensor scan line;
a first capacitor connected between the second node and the ith sensor scan line; and
a second capacitor connected to the second node.

17. The touch sensor of claim 16, wherein the sensor pixel further comprises a third transistor connected between the second node and the reference voltage line and having a gate electrode connected to an (i−1)th sensor scan line.

18. A display device comprising:
a substrate;
a plurality of sensor pixels positioned on the substrate and connected to sensor scan lines and output lines; and
a display panel separate from the substrate and including a plurality of display pixels and an auxiliary electrode,
wherein one of the sensor pixels connected to an ith sensor scan line and a jth (where i is an integer of no less than 2 and j is a natural number) output line comprises:
a sensor electrode;
a first transistor having a gate electrode connected to the sensor electrode to control a current output through the jth output line;
a second transistor having a gate electrode directly connected to the ith sensor scan line and connected between a reference voltage line and one of a source electrode and a drain electrode of the first transistor; and
a capacitor electrode forming a first capacitor with the sensor electrode and connected to the ith sensor scan line.

19. The display device of claim 18, wherein the sensor pixel further comprises a third transistor having a gate electrode connected to an (i−1)th sensor scan line and connected between the reference voltage line and the sensor electrode.

20. The display device of claim 18, wherein the auxiliary electrode forms a second capacitor with the sensor electrode.

21. The display device of claim 20, further comprising an insulating member positioned between the substrate and the display panel.

22. The display device of claim 21, wherein the display panel is flexible to permit bending or folding by a user and the insulating member has sufficient elasticity to permit bending or folding of the flexible display panel.

23. The display device of claim 21, wherein the insulating member comprises:
an elastic layer;
a first adhesive layer positioned between the elastic layer and the substrate; and
a second adhesive layer positioned between the elastic layer and the display panel.

24. The display device of claim 20, wherein capacitance of the second capacitor changes in response to touch pressure applied to the at least one sensor pixel.

25. The display device of claim 24, wherein a distance between the sensor electrode and the auxiliary electrode is reduced as the touch pressure increases.

26. The display device of claim 25, wherein a current output through the jth output line is reduced as the touch pressure increases.

27. The display device of claim 20, wherein, when a touch is applied to the at least one sensor pixel by a finger of a user, the sensor electrode forms a third capacitor together with the finger.

28. The display device of claim 27, wherein pressure caused by the touch is sensed by a change in capacitance of the second capacitor responsive to the touch.

29. The display device of claim 28, wherein a fingerprint of the finger is recognized by a change in capacitance of the third capacitor responsive to the touch.

30. The display device of claim 18,
wherein the display pixels respectively comprise organic light emitting diodes (OLED), and
wherein the auxiliary electrode is a cathode electrode commonly included in the OLEDs of the display pixels.

31. The display device of claim 18, wherein the auxiliary electrode overlaps sensor electrodes included in the plurality of pixels.

32. The display device of claim 18, further comprising a sensor scan driver configured to sequentially supply sensor scan signals to the sensor scan lines.

33. The display device of claim 32, further comprising a read-out circuit configured to detect at least one of a fingerprint and touch pressure by using currents output through the output lines.

34. The display device of claim 18, wherein the sensor electrode is formed of a transparent conductive material.

35. The display device of claim 18, further comprising a sensor protective layer positioned the substrate and the sensor pixels.

\* \* \* \* \*